United States Patent
Lahijani

(10) Patent No.: US 8,460,503 B2
(45) Date of Patent: Jun. 11, 2013

(54) PIPE PREFORMED LINER COMPRISING METAL POWDER

(75) Inventor: Jacob Lahijani, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/234,646

(22) Filed: Sep. 16, 2011

(65) Prior Publication Data

US 2012/0003414 A1 Jan. 5, 2012

Related U.S. Application Data

(62) Division of application No. 11/640,665, filed on Dec. 18, 2006, now Pat. No. 8,039,073.

(60) Provisional application No. 60/751,815, filed on Dec. 20, 2005.

(51) Int. Cl.
- B29C 65/00 (2006.01)
- B29C 47/00 (2006.01)
- B32B 37/00 (2006.01)
- B32B 38/10 (2006.01)
- B05D 7/22 (2006.01)

(52) U.S. Cl.
USPC ....... 156/294; 156/153; 156/244.13; 427/231

(58) Field of Classification Search
USPC ............ 156/60, 71, 84, 90, 94, 153, 156, 156/160, 165, 196, 212, 215, 217, 218, 242, 156/244.11, 244.13, 244.18, 244.27, 250, 156/256, 269, 270, 271, 283, 285, 287, 293, 156/294, 303.1, 311, 312; 264/36.16, 36.17; 138/98; 427/140, 142, 230, 231, 233, 234, 427/236, 238, 239
See application file for complete search history.

(56) References Cited

U.S. PATENT DOCUMENTS

| 2,833,686 | A | 5/1958 | Sandt |
| 3,087,827 | A | 4/1963 | Klenke, Jr. et al. |
| 3,087,828 | A | 4/1963 | Linton |
| 3,087,829 | A | 4/1963 | Linton |
| 3,462,825 | A | 8/1969 | Pope et al. |
| 4,380,618 | A | 4/1983 | Khan et al. |
| 4,714,756 | A | 12/1987 | Buckmaster |
| 4,743,658 | A | 5/1988 | Imbalzano et al. |
| 4,921,668 | A | 5/1990 | Anderson et al. |
| 5,082,610 | A | 1/1992 | Fish, Jr. et al. |
| 5,192,476 | A * | 3/1993 | Green ............... 264/127 |
| 5,397,831 | A | 3/1995 | Saito et al. |
| 5,454,419 | A | 10/1995 | Vloedman |
| 5,981,673 | A | 11/1999 | DeSimone et al. |
| 6,140,410 | A | 10/2000 | Kolouch |
| 6,228,204 | B1 | 5/2001 | Reinhardt et al. |
| 6,632,902 | B2 | 10/2003 | Lahijani |
| 7,537,815 | B2 | 5/2009 | Lahijani |
| 7,575,789 | B2 | 8/2009 | McKeen |
| 7,892,600 | B2 | 2/2011 | Lahijani |
| 8,013,089 | B2 | 9/2011 | Lahijani |
| 8,039,073 | B2 | 10/2011 | Lahijani |
| 2003/0130432 | A1 | 7/2003 | Araki et al. |
| 2004/0138367 | A1 | 7/2004 | Lahijani |
| 2005/0061533 | A1 * | 3/2005 | Lovoi et al. .......... 174/68.1 |
| 2005/0173012 | A1 | 8/2005 | McKeen |
| 2005/0229992 | A1 | 10/2005 | McKeen et al. |
| 2011/0226806 | A1 * | 9/2011 | O'Dougherty et al. ......... 222/1 |

FOREIGN PATENT DOCUMENTS

| EP | 1217278 A1 | 6/2002 |
| JP | 568228 A | 1/1981 |
| JP | 56008228 A * | 1/1981 |
| JP | 57-178857 A | 11/1982 |
| JP | 57178857 A * | 11/1982 |
| JP | 59-123621 A | 7/1984 |
| JP | 59123621 A * | 7/1984 |
| JP | 4-267744 A | 9/1992 |
| JP | 04267744 A * | 9/1992 |

OTHER PUBLICATIONS

Ebnesajjad, S., "vol. 2: Melt Processible Fluoropolymers the Definitive User's Guide and Databook", Fluoroplastics, 2003, p. 264, Plastics Design Library, Norwich NY.

* cited by examiner

Primary Examiner — Philip Tucker
Assistant Examiner — Brian R Slawski
(74) Attorney, Agent, or Firm — Kevin J. Boland

(57) ABSTRACT

The present invention relates to a preformed liner of Tetrafluoroethylene/perfluoro(alkyl vinyl ether) copolymer adhered to the surface of a pipe, and in particular, an oil well pipe, without the need for either a primer layer or an adhesive. The liner comprises an effective amount of metal powder which provides adhesion between the liner and the surface of the pipe. The present invention also relates to a process for making such pipe, where in a preferred embodiment, the liner is co-extruded to form an inner layer and an outer layer. This co-extrusion embodiment is particularly useful in applications where high purity is necessary. In this case, the inner layer comprises an effective amount of metal powder and the outer layer is pure tetrafluoroethylene/ perfluoro(alkyl vinyl ether) copolymer.

13 Claims, No Drawings

PIPE PREFORMED LINER COMPRISING METAL POWDER

CROSS-REFERENCE TO RELATED APPLICATIONS

This application is a division of U.S. patent application No. 11/640,665, filed Dec. 18, 2006, now U.S. Pat. No. 8,039,073, which claims priority from U.S. Provisional Application No. 60/751,815, filed Dec. 20, 2005.

FIELD OF THE INVENTION

This invention relates to a preformed perfluoropolymer liner comprising an effective amount of metal powder to cause the preformed liner to adhere to the interior surface of pipe without the need to use either a primer layer or an adhesive. The present invention is particularly useful for an oil well pipe.

BACKGROUND OF THE INVENTION

Rotolining vessels to coat the interior surface of a vessel with a desired thickness of fluoropolymer is known, as disclosed in J. Scheirs, Modern Fluoropolymers, John Wiley & Sons (1997). In such a process, a sufficient amount of fluoropolymer in powder form is added to a metal vessel to coat the interior surface of the vessel with the desired thickness of the fluoropolymer, followed by rotating the vessel about one or more axes in an oven, to melt the fluoropolymer, whereby the fluoropolymer covers the interior surface of the vessel and forms a seamless lining. This fluoropolymer lining protects the vessel from corrosive materials stored or handled by the vessel, by virtue of the chemical inertness of the fluoropolymer forming the lining and of the lining being continuous with respect to the interior surface of the vessel that would be exposed to the corrosive materials if the lining were not present. Thus, the lining is free of holes, even pinholes, through which the corrosive material could penetrate the lining to attack the material of construction of the vessel. Adherence to fluoropolymer surfaces are rare because of the non-stick property of fluoropolymer, so such linings are not subject of deposition of components of conveyed materials, as may occur if the conveyed material cools in transport, causing less soluble components to come out of solution. Similarly, materials conveyed in the lined vessel are not exposed to metal making up the vessel and are not thereby contaminated. The materials contact only the inert fluoropolymer surface of the lining. However, rotolining can be costly because the oven which is used for this process is expensive, particularly when the vessel must be rotated about multiple axes.

Certain melt-processible fluoropolymers, such as copolymers of ethylene with either tetrafluoroethylene (ETFE) or chlorotrifluoroethylene (ECTFE), on rotolining, form linings which adhere to the interior surface of the vessel without the used of primer or adhesive. However, for the perfluorinated melt processible copolymers, such as tetrafluoroethylene/hexafluoropropylene (FEP) and tetrafluoroethylene/perfluoro(alkyl vinyl ether) (PFA), the lining does not adhere so well to the vessel, instead forming a "loose lining". Loose linings are held in place by the configuration of the interior surface of the vessel, i.e., mechanically locked into place. While this is satisfactory in some applications, the lack of adhesion between lining and interior surface of the vessel becomes disadvantageous in such vessels as pipes, where the opportunity for mechanical restraint on movement of the lining is limited, especially as the length of the pipe increases. Moreover, the passage of material, such as oil through the pipe, especially when the flow of the material varies, subjects the lining to vibration and mechanical stress, which can cause the lining to crack and fail. For corrosive materials, lining failure exposes the vessel to corrosion. For materials in which maintenance of purity is critical, such as food processing, pharmaceuticals and semi-conductor processing, where contamination of the medium being conveyed by exposure to the material of construction of the vessel (i.e., metal), caused by such cracking and failure, is unacceptable.

Furthermore, with loose linings, gas can diffuse into the space between the lining and the vessel wall, pushing the lining away from the all and restricting material flow. This can lead to blockage and interrupted flow, which are undesirable.

Methods of lining pipes with preformed films are known, see for example, U.S. Pat. No. 2,833,686 to Sandt and Research Disclosure No. 263060, which describe liners made of polytetrafluoroethylene, which is a non-melt-processible fluoropolymer. Both of these references use a fluorinated ethylene propylene bonding agent, which does not provide particularly good adhesion because of the non-stick properties of fluoropolymers generally.

A fluoropolymer preformed liner for a pipe is disclosed in U.S. Pat. No. 3,462,825 to Pope. No bonding agent is used in this Patent. Consequently, pressure and temperature cycling that may occur in the use of such lined pipes can cause the lining to buckle, pulling away from the interior surface allowing accumulation of gases and liquids between the liner and the wall surface and narrowing the path of oil flow.

It would be desirable to be able to line a pipe with melt processible perfluoropolymer thereby creating an interior surface which has resistance to the corrosive effects of acids, and to which it is difficult for materials to adhere, which adheres well to the pipe, and which does not rely on the use of bonding agents or rotolining with fluoropolymer powders. Because of its resistance to cracking and failure, such a lining would be suitable for industries which require high purity. Further there is a desire that the lining be durable and adhere well to the pipe, and not likely to buckle, when used for many years for conveying corrosive materials.

BRIEF SUMMARY OF THE INVENTION

With the present invention, a preformed perfluoropolymer liner is used to line a pipe to provide a surface which is resistant to attack by corrosive materials, and which does not contaminate the flowable material conveyed in the lined pipe.

Good adhesion of liner to pipe is obtained because of the presence of a metal powder in the pipe's preformed liner, which facilitates bonding of the liner to the surface of the pipe. It is unexpected that the preformed liner adheres particularly well to the interior surface of the pipe in a simple heating step, without the need for an adhesive or a primer layer. The bonding of the liner to the interior surface of the pipe involves the heating of the pipe sufficiently to melt the liner and then cooling the pipe. The liner has a greater shrinkage during cooling than the pipe, which would tend to pull the liner away from the interior surface of the pipe. Nevertheless, with the present invention, the adhesion achieved by heating surprisingly remains intact on cooling, resulting in a liner which does not pull away from the pipe's interior surface.

In addition, with the present invention, it is possible to line small diameter pipes, and small fittings and elbows, which is not possible with coating processes such as rotolining. This is because there is not enough room in a small pipe to accommodate the quantity of polymer particles needed for coating the interior of the pipe. Moreover, even the polymer particles were forced into the pipe, the polymer must flow freely, and there is not enough room in a small pipe for this free flow.

The present invention is lower cost than conventional rotolining processes, which require use of a rotolining machine having an oven in which the vessel or pipe to be coated must be rotated for extended periods of time (see "Fluoroplastics", Vol. 2, "Melt Processible Fluoropolymers", S. Ebnesajjad, Plastics Design Library, Norwich, N.Y., 2003, p.264). In contrast, the present invention may use a conventional oven, or in a preferred embodiment the pipe may be rotated about a single axis in the oven.

The present invention produces preformed liners which are particularly useful in high purity applications. In a co-extrusion embodiment, an outer layer which is in contact with the flowable medium is formed from a pure melt processible perfluoropolymer, i.e., a melt-processible copolymer of tetrafluoroethylene and perfluoro (alkyl vinyl ether) with no zinc or other metal powder present, and an inner layer is formed, which has zinc or metal powder present. With this configuration, it is possible to get good adhesion to the pipe from a liner which does not contaminate the flowable medium.

Because the lining of the present invention resists deposition, and because it has good adhesion and resists cracking and failure, it is particularly suitable for processes which require high purity, such as food processing, pharmaceuticals and semi-conductor processing.

Such high purity applications can be achieved in particular by a co-extrusion embodiment, in which an outer layer which is in contact with the flowable medium is formed from a pure perfluoropolymer. There is no zinc or other metal powder present in this outer layer. An inner layer which has zinc or metal powder present, is formed next to the pipe. With this configuration, it is possible to get good adhesion of the liner to the pipe.

Therefore, in accordance with the present invention, there is provided a pipe including a preformed liner comprising a melt-processible copolymer of tetrafluoroethylene and perfluoro (alkyl vinyl ether) and an effective amount of metal powder to cause the liner to adhere to the interior and/or exterior surface of the pipe.

Further in accordance with the present invention, there is provided process for forming a pipe having a preformed liner comprising a comprising a melt-processible copolymer of tetrafluoroethylene and perfluoro (alkyl vinyl ether) and an effective amount of metal powder to adhere the liner to the interior surface of the pipe, comprising forming said preformed liner, inserting said liner into the pipe and adhering the liner to the interior surface of the pipe.

The liner may also be fitted over the exterior of the pipe and the pipe and liner are heated, thereby adhering the liner to the exterior surface of the pipe.

According to a further embodiment of the present invention, the pipe and the liner may be rotated about a single axis in an oven to heat the pipe and the liner and adhere the liner to the pipe. Rotation provides good heat distribution and provides for uniform adhesion of the liner to the surface of the pipe, eliminating buckling of the liner. Since no adhesive agent is used to hold the liner in place, rotation prevents the collapse of the liner on itself.

According to another embodiment of the present invention, the preformed liner may be formed by co-extruding an inner layer and an outer layer. The outer layer of the liner consists essentially of, i.e., is pure perfluoropolymer of melt-processible copolymer of tetrafluoroethylene and perfluoro (alkyl vinyl ether) and the inner layer of the liner which adheres to the pipe comprises a mixture of a melt-processible copolymer of tetrafluoroethylene and perfluoro (alkyl vinyl ether) and a metal powder.

DETAILED DESCRIPTION OF THE INVENTION

The present invention is directed to a pipe including a preformed liner adhered to the surface of a pipe. While the discussion herein focuses on preformed liners inserted inside the pipe for use where flowable materials are conveyed in the pipe, it will also occur to those skilled in the art that the preformed liner can be inserted on the inside of the pipe, fitted as a sleeve on the outside of the pipe, as might be the case in a heat exchanger in which cooling or heating fluid is pumped through the pipe to heat or cool a fluid passing over the outside of the pipe. There may be uses in which it is useful to have both the internal and the external surfaces of a pipe covered with the liner of this invention.

The preformed liner is useful in reducing the corrosive effects of the environment and of particular materials to which the surfaces of the pipe are exposed, even though the environments and materials encountered inside and outside the pipe may be different The perfluoropolymer lined pipe according to the present invention may convey flowable media which have a high purity requirement. Such media may be corrosive. Such media are often encountered in industries such as food processing, pharmaceuticals and semi-conductor processing. This is also applicable to CPI (Chemical Processing Industry).

In addition the perfluoropolymer lined pipe according to the present invention may convey chemicals or oil which are subject to corrosion and are capable of plugging pipes through which they are conveyed. An example of such pipe is oil pipe, known as "down-hole" pipe, which is generally large diameter and for reasons of economy is manufactured from carbon steel rather than more expensive corrosion-resistant alloys. Corrosion is induced by the hot underground environment in which down-hole pipes convey oil from deeply buried deposits to the earth's surface.

Materials such as water, sulfur, sulfur dioxide, carbon dioxide, present in the oil typically make it acidic and capable of corrosive attack on the unprotected surface of carbon steel pipe. Even at cooler temperatures, transportation pipelines that extend for long distances at or near the earth's surface experience the effects of corrosion because of the long contact times involved. Corroded pipes are difficult and expensive to replace, and present personal and environmental hazards.

Thus, the present invention is particularly useful with oil pipes. Such oil pipes may be used as joined sections in an oil transportation pipeline or a down-hole oil well pipeline, it being understood, however, that the pipe of the present invention is not so limited in its application. Oil pipes are generally large, having an inner diameter of at least about 2 in (5 cm) and sometimes as large as about 6 in (15.24 cm) and length of at least about 10 ft (3 m), more often at least about 20 ft (6.1 m) and often a length of at least about 30 ft (9.1 m).

The pipes are typically made from rigid metal, although they could be made of flexible metal tubing. As stated above, for reasons of economy they are usually made of carbon steel and as such are prone to corrosive attack from acidic entities in the oil unless protected by a corrosion resistant coating. In this invention, a perfluoropolymer, which is both corrosion resistant and which possesses good release characteristics, covers the interior surface of the pipe. The beneficial effects of the perfluoropolymer liner of this invention are also seen for pipes that are made from other metals such as aluminum, as well as stainless steel and other corrosion resistant alloys, on which the non-stick character of the perfluoropolymer liner confers resistance to adhesions forming from components in the material conveyed through the pipe. The deposition of asphaltenes from crude oil is one example of such adhesions.

While the relative dimensions of the oil pipe made in accordance with the present invention are large, the thickness of the liner need not be great. In an especially preferred embodiment, the preformed liner typically has a thickness from about 20 mils to about 250 mils (500-6250 micrometers), preferably from about 20 mils to about 100 mil (500-2500 micrometers). The large area of the interior surface of pipe over which the preformed liner is unsupported except by adhesion to the interior surface of the pipe requires high integrity for the adhesion. Otherwise the varying conditions of temperature, pressure, and mechanical contacts could cause the liner to separate from the interior surface, leading to loss in corrosion and possibly even non-stick protection if the liner ruptures. Further, separation of the liner may result in collapse of the liner causing reduced flow or even plugging.

Therefore, the preformed liner according to the present invention comprises a melt-processable copolymer of tetrafluoroethylene and perfluoro (alkyl vinyl ether) which provides the necessary non stick properties to the liner and an effective amount of metal powder to adhere the liner to the pipe. The adequacy of adhesion is measured using the 90° Peel Test, as will be described below in the Examples. The peel strength which can be achieved by the present invention is at least 10 pounds force per inch (10 lbf/in, 1750 N/m), and preferably at least twenty pounds force per inch (20 lbf/in, 3500 N/m), and even more preferably at least 25 pounds force per inch (25 lbf/in, 4400 N/m).

The metal powder is an adhesion promoting, non-bubble promoting metal powder. Preferred metal powders that cause the preformed liner to adhere to the surface to the surface of the pipe are powders of zinc (Zn), copper (Cu), tin (Sn), or combinations thereof either as physical blends, or as alloys. Examples of alloys include Cu/Zn (brass) and Cu/Sn (bronze). These metal powders are used in small amounts, preferably from about 0.1 wt % to about 10 wt %, more preferably about 0.5 wt %, to about 7 wt %, based on polymer. The metal powder typically has a particle size no greater than about 100 μm, preferably less than about 60 μm. At least about 75 wt % and preferably at least about 90 wt % of the metal powder particles will have a particle size in the range of about 1 to 100 μm.

The metal powder can simply be dry blended with powder of melt-processible co-polymers of TFE and formed into pellets, either by physical compacting or by melt-extrusion into a strand or stands which are then cut to form what are known in the art as pellets, usually referring to melt-cut strand, or cubes, usually referring to strand cut after cooling. For convenience, the term "pellet" will be used to include both pellets and cubes. Pellets are typically about 3000-4000 μm in diameter and from about 1000-2000 μm in length. There are also "minicubes", which are suitable for use according to this invention. Minicubes are extruded and cut like cubes, but range in length from about 200-2000 μm, and are about 1000 μm in diameter, as disclosed in U.S. Pat. No. 6,632,902. Minicubes are included as "pellets" as that term is used herein.

For most efficient dry blending, it is desirable that the metal powder and the melt-processible perfluoropolymer powder be similar in size. For a description of melt-processible perfluoropolymer powder, see U.S. Pat. No. 4,714,756 (the heat-hardening described in that patent is not necessary for dry blending according to the present invention). The extruder is chosen to get adequate uniform mixing of metal powder and perfluoropolymer powder to make the metal powder-perfluoropolymer blend. This can be done with single-screw extruder or a twin-screw extruder, the latter giving better mixing if this should be necessary. Screw design, such as the presence of mixing elements, can also be chosen to optimize mixing without over working the polymer.

"Powder" as used in the preceding paragraph includes the term "bead", sometimes used for fluoropolymer intended for rotomolding applications as disclosed in U.S. Pat. No. 4,714,756. Particle size of powder is typically less than about 500 μm.

Alternatively, metal powder may be dry blended with already-pelletized perfluoropolymer and fed to an extruder to make pellets of the blend of metal powder and perfluoropolymer. The dry blending is done at room temperature. With the greater disparity in size of perfluoropolymer pellets and metal powder, better mixing in the extruder may be necessary.

The metal powder-perfluoropolymer blends described in the preceding paragraphs may be of a composition rich in metal powder so that the resulting pellets can be used as "concentrate" which can be "let down" by mixing with additional perfluoropolymer (containing no metal powder) in making perfluoropolymer liner with the desired amount of metal powder. In the case of concentrate, the amount of metal powder in the pellets can exceed the 10 wt % described above as the preferable maximum for the perfluoropolymer liner.

It is not necessary to pelletize the metal powder-perfluoropolymer dry blend before making the perfluoropolymer liner. If desired, the dry blend may be directly extruded to make the perfluoropolymer liner.

If it is desirable to stabilize the copolymer with a fluorination treatment, as will be described below, such treatment is performed prior to dry blending, so that the fluorine does not react with the metal powder. The preformed liner of the present invention comprises, in addition to the metal powder, a melt-processable copolymer of tetrafluoroethylene and perfluoro (alkyl vinyl ether).

By melt-processible it is meant that the polymer can be processed in the molten state, i.e., fabricated from the melt into shaped articles such as films, fibers, and tubes etc. that exhibit sufficient strength and toughness to be useful their intended purposes. Examples of such melt-processible copolymers of tetrafluoroethylene (TFE) and at least one perfluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than about 315° C. Comonomers used in this invention are perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms. The resulting TFE/PAVE copolymers are commonly referred to as PFA polymer. The copolymer can be made using several PAVE monomers. In the case of TFE/perfluoro(propyl vinyl ether/perfluoro(methyl vinyl ether) (TFE/PPVE/PMVE) copolymer, the manufacturer refers to the polymer as MFA. Preferred perfluoropolymers according to this invention PFA (TFE/PAVE copolymer), TFE/HFP/PAVE wherein PAVE is PEVE and/or PPVE (this terpolymer made for commercial use generally has a greater weight percent HFP content that PAVE content, and is often considered a member of the FEP family of copolymers) and MFA.

The melt-processible copolymer is made by incorporating an amount of comonomer into the copolymer in order to provide a copolymer which typically has a melt flow rate of about 0.1-100 g/10 min as measured according to ASTM D-1238 at the temperature which is standard for the specific copolymer. Preferably the melt flow rate is 0.5 to 50 g/10 min. Typically, the melt viscosity will range from about $10^2$ Pa·s to $10^6$ Pa·s, preferably about $10^3$ to $10^6$ Pa·s measured at 372° C. by the method of ASTM D-1238 modified as described in U.S. Pat. No. 4,380,618.

The perfluoropolymer of this invention is preferably non-elastomeric, that is it is perfluoroplastic, and has a melting point at a heat of fusion of at least about 3 J/g, preferably at least about 9 J/g. This is measured by differential scanning calorimetry (DSC). ASTM D-3418 describes the method.

The melting temperature of the liner will vary according to its composition. By melting temperature is meant the temperature at the peak of the melting endotherm obtained by DSC analysis. By way of example, tetrafluoroethylene/perfluoro(propyl vinyl ether) copolymer melts at about 305° C. Tetrafluoroethylene/perfluoro(methyl vinyl ether)/perfluoro(propyl vinyl ether) copolymer (MFA) has a melting point in between these melting temperatures, generally about 290° C.

The perfluoropolymer according to this invention may have unstable end groups which on heating can decompose to volatile product, such as carbon dioxide and hydrogen fluoride, which can cause bubbles and voids during extrusion. Polymer prepared by aqueous polymerization tends to have unstable end groups. Polymer made by nonaqueous polymerization (one method is described in U.S. Pat. No. 5,981,673) using suitable initiator has few or no unstable end groups and does not need further treatment to reduce the concentration of unstable end groups.

As described in EP 0 226 668 and in U.S. Pat. No. 4,743,658, the copolymer may be stabilized by exposing the copolymer particles to fluorine for a sufficient time to reduce the unstable end group population in the copolymer to less than about $80/10^6$ carbon atoms present in the copolymer. This fluorine treatment can be used on the copolymer particles used in the present invention to reach the same endpoint, less than about 80 unstable end groups/$10^6$ carbon atoms, preferably less than about 50, more preferably, less than about 10, and even more preferably less than about 3 unstable end groups/$10^6$ carbon atoms. Examples of unstable end groups are —COOH, —CONH$_2$, —CH$_2$OH, —CO$_2$CH$_3$, —CF=CF$_2$, and —COF. The exposure of these end groups to fluorine converts these unstable end groups to the very stable —CF$_3$ end groups. The analysis for unstable end groups is disclosed in U.S. Pat. No. 4,743,658.

The preformed liner is preferably made by extruding the perfluoropolymer and metal powder, preferably blended and pelletized in a preceding step as described above. Extrusion is done preferably using a die to make the preformed line, usually in the form of a tube if a circular pipe is to be lined. The outer diameter of the tube is chosen with the dimensions of the pipe and method of bringing the pipe and liner together in mind. The preformed liner could also be made by rotomolding.

In applications where purity of the flowable medium is important, a multilayer liner can be made by coextrusion. The layer that will contact and adhere to the pipe, referred to herein as the "inner layer", contains the metal powder described above. The layer that will contact the flowable medium, referred to herein as the "outer layer", contains no metal powder or other matter apart from the perfluoropolymer. Thus the perfluoropolymer contacting the flowable medium is perfluoropolymer only, and contains no nonfluoropolymer contaminants that might contaminate the flowable medium. The perfluoropolymers that make up the inner and outer layers are preferably of the same general monomer composition for best adhesion between the layers. It is not necessary that compositions be exactly the same, but the closer they are the better for interlayer adhesion. The viscosities (as measured by melt flow rate) of the polymers that make up the inner and outer layers need not be the same so long as the polymers can be successfully coextruded. The inner layer of the preformed liner adheres to the surface of the pipe, and the outer layer adheres to the preformed liner, thereby forming a thick adherent overall lining on the surface of the pipe.

The outer layer copolymer need not be stabilized such as by fluorination or humid heat treatment, but is preferably stabilized so as to provide the most chemically inert surface in contact with the medium contained in the pipe being lined. The copolymer can be stabilized by fluorine treatment as described above.

The thickness of the liner for lining the interior of a pipe will be dependent on diameter of the pipe as well as for the intended use of the pipe. Preferably the thickness of a single layer is from about 2 mils to about 500 mils. The liner may be comprised of multiple layer each layer having a thickness of 2 mils to 500 mils. In a preferred embodiment comprising 3 layers, the first layer of the liner has a thickness of from about 25 mils to 90 mils, the second layer has a thickness of from about 50 mils to 180 mils, and the third layer has a thickness of from about 50 mils to 180 mils greater than the thickness of. In a multilayer liner, the inner layer of the preformed liner can be thin relative to the outer layer of the liner.

In a preferred embodiment, the preformed liner includes a plurality of barrier particles that are relatively inert to chemical attack by the flowable medium to which the pipe will be exposed. The particles form a mechanical barrier against permeation of water, solvent and gases, such as oxygen, through the liner to the surface of the pipe. Particles are present in the amount of about 0.5 to about 10% by weight based on the total dry weight of the preformed liner. Such particles tend to align in the making of the preformed liner during conventional extrusion processes and contribute to the permeation resistance of the liner. Since oxygen, solvent and water cannot pass through the particles themselves, the presence of the aligned particles further reduces the rate of permeation through the preformed liner by increasing the path length from the outer (exposed to the flowable medium) surface of the liner to the inner (in contact with the pipe surface) surface of the liner. In a particularly preferred embodiment, where the preformed liner is co-extruded, the barrier particles are included in the inner layer. Alternatively, an intermediate layer, which is part of the preformed liner, containing barrier particles can be extruded between the inner layer and the outer layer of a multi-layer preformed liner.

Preferably the particles are platelet-shaped particles. Examples of typical platelet shaped filler particles include mica, glass flake and stainless steel flake. The platelet shaped particles are preferably mica particles, including mica particles coated with an oxide layer like iron or titanium oxide. These particles have an average particle size of about 10 to 200 µm, preferably 20-100 µm, with no more than 50% of the particles of flake having average particle size of more than about 300 µm. The mica particles coated with an oxide layer are described in U.S. Pat. Nos. 3,087,827 (Klenke and Stratton); 3,087,828 (Linton); and 3,087,829 (Linton). The micas described in these patents are coated with oxides or hydrous oxides of titanium, zirconium, aluminum, zinc, antimony, tin, iron, copper, nickel, cobalt, chromium, or vanadium. Mixtures of coated micas can also be used.

In alternate embodiments, other particles can be included in the preformed liner. Such particles confer improved rigidity evidenced by better tensile and elongation properties, improved wear resistance and/or reduced thermal dissipation. One preferred type of particle is a ceramic hollow micorsphere such as Zeeospheres G850 supplied by 3M Company. Another preferred particle is a fiber of aromatic polyamide such as DuPont Kevlar® or DuPont Nomex® aramid fibrids, pulp, or floc.

In the following discussion of the insertion of the preformed line into the pipe, the surface of the preformed liner that contacts the surface of the pipe is the "inner surface". The surface of the preformed liner that contacts the flowable material in the finished lined pipe, is the "outer surface".

A pipe is made according to the process of the present invention in the following manner. Typically the as-manufactured and supplied pipe, such as an oil pipe, will have a coating of preservative (rust inhibitor) on the interior, relatively smooth surface to resistance rust. The pipe interior surface may be cleaned and then roughened, for instance by grit blasting, thereby ridding such surface of contaminants that could interfere with adhesion and providing a more adherent surface for the primer layer if used and for the preformed film. Conventional soaps and cleansers can be used. The pipe can be first cleaned by baking at high temperatures in air, temperatures of 800° F. (427° C.) or greater. The cleaned interior surface is then preferably grit blasted, with abrasive particles, such as sand or aluminum oxide, or can be roughened, such as by chemical etching, to form a roughened surface to improve the adhesion of the preformed liner. The grit blasting is sufficient to remove any rust that may be present, thereby supplementing the cleaning of the interior surface. The roughening that is desired for adhesive adhesion can be characterized as a roughness average of 1-75 µm Ra as measured according to ASTM F-1438.

In accordance with the present invention, the liner is inserted into the pipe. There are several common techniques for doing this. In a "slip fit" embodiment, the preformed liner is tubular, with the outer diameter of the tube being slightly smaller than the inner diameter of the pipe to be lined. This allows the liner to be freely slipped into the pipe. Upon heating, the liner expands and adhere firmly to the inside of the pipe.

In certain other embodiments, the preformed liner is tubular, with the outer diameter of the tube being greater than the interior diameter of the pipe to be lined. In a preferred embodiment the initial outer diameter of the preformed liner is about 10 to 15% greater than the inner diameter of the pipe. In a more preferred embodiment, the preformed liner is applied to the interior surface of the pipe according to the teachings of U.S. Pat. No. 3,462,825 (Pope et al.) by gripping one end of the liner, stretching it and thereby reducing its outer diameter, and then pulling the liner into the oil pipe mechanically. When the liner has been inserted, tension is released and the liner expands into tight engagement with the interior surface of the pipe. A preferred method for reducing the outer diameter is to pull the liner into the oil pipe through a reduction die as taught in Pope et al. Alternative means of reducing the diameter of the tubular liner such that it could be pulled into the oil pipe of smaller inner diameter include 1) pulling the tubular liner under tension such that the length of the liner increases and the diameter of the liner decreases as described in U.S. Pat. No. 5,454,419 to Vloedman or 2) pulling the tubular liner through diameter reducing rollers similar to those described in Canadian Patent No. 1241262 (Whyman et al.). In either case, once the tubular liner is inserted in the oil pipe, it is released allowing the liner to expand into tight engagement with the interior surface of the pipe.

An alternate method of producing a lined pipe is called swaging. In this embodiment, the preformed film is preferably in the shape of tubular liner with the outer diameter of the tube being less than the interior diameter of the pipe to be lined. In a preferred embodiment, the initial outer diameter of said tubular liner is about 10 to 15% less than the inner diameter of the pipe. Swaging involves mechanically reducing the diameter of a steel pipe around a liner by use of a swaging device such as an Abby Etna Rotary Swager which applies an abundant amount of force to the pipe through hammering, for example applying 2400 blows per minute to cause the pipe to fit around the liner. After the liner is inserted and the pipe is "swaged" down around the liner, the pipe is heated.

After the liner is inserted in the pipe, the pipe is then heated in order to adhere the inner surface of the liner to the interior surface of the pipe. The pipe is heated by either oven heating or induction heating, or other heating method. In a preferred embodiment, the oven is equipped with a rotating axis such that the pipe is rotated to achieve even heat distribution, such as, for example, in a rotolining machine. For example, exposure to any heat source sufficient to heat or in certain cases melt only the liner's outer layer (contacting the pipe) without melting the remainder of the liner would be suitable. These could also include but are not limited to, for example, flame treating and high temperature electrical resistance furnaces. Still other heat sources which can be used include the heat from a gas fired indirect heater. A very short duration heat source would also accomplish the objective. Detailed examples of such intense heat sources would include but are not limited to oxyacetylene torches and heating elements of molybdenum disilicide (available as Kanthal Super 33 heating elements from Kanthal Corporation, Bethel, Conn.). In such an arrangement, very accurate temperature control could be achieved. This is because modest changes to the oven temperature would result in small temperature differences at the liner inner surface. The required oven temperature would then be determined empirically by adjusting the speed at which the pipe moves through the heated zone and the temperature of said zone.

This technique has been successfully applied to production of monofilaments (see, e.g. U.S. Pat. Nos. 4,921,668, Anderson, et al. to DuPont and 5,082,610, Fish, et al. to DuPont) but has not been applied to lining pipes until now. These and other such changes in heating mechanism may all be made without departing from the spirit of this invention.

When induction heating is used, instead of heating in an oven, heat is applied to the outside of the pipe to heat the pipe. Induction heating of a metallic component is achieved by passing high-frequency electric current through a coil surrounding a workpiece. This in turn induces a high-frequency electromagnetic field in the piece. The magnetic field induces currents in the workpieces and the electrical resistance of the piece to the flow of current causes the piece to heat up.

The heat in the pipe is sufficient to cause the liner to expand against the interior surface of the pipe and adhere the liner to the surface of the pipe. The maximum pipe temperature varies according to the particular copolymer being used, and may go up to 760° F. (404° C.), with the lower end of this temperature range being 690° F. (366° C.). Time for adherence will be dependent on the heating temperature used, but the time of exposure to the maximum temperature is typically in the range of 40 minutes to 5 hours. When induction heating is used, the time of exposure to the maximum temperature is typically in the range of seconds.

In the induction heating process of the present invention, the pipe moves in proximity to an heating induction coil at a scanning rate of about 1-30 inches per minute (2.5-75 cm/min), preferably about 10-20 inches per minute (25-50 cm/min). Alternatively, an heating induction coil may be moved in proximity to the pipe at these scanning rates.

According to the process of the present invention, after the heating step, the pipe is then cooled. The cooling rate may be controlled in different ways. Options for cooling include 1) room temperature air cooling or 2) via cooling rings, water jets, etc.

With the present invention, the pipes can be moved along the heating induction coil, or vice versa, so that one can process large pipes without the need for a bulky, standard convection oven, which is requires a large capital investment. Moreover, the process of the present invention allows the liner to be adhered in the field, allowing for on-site construction or repair, which significantly increases the flexibility of applying a liner.

When the liner is applied to the interior surface of the pipe, the expansion of the preformed liner during the heating step, while theoretically greater than the expansion of the pipe, is constricted by the pipe (when the liner is being applied to the inside of the pipe) and also is limited by the relaxation effect of the heating of the liner to the molten or near molten condition. As the pipe cools, there is a tendency for the preformed liner to shrink. The shrinkage of the liner during cooling starts from this relaxed condition and then outpaces the shrinkage of the pipe. Under this condition, it is surprising that adhesion of the liner is maintained during cooling. Unexpectedly, the adhesion between the pipe and the preformed liner is sufficient to prevent the liner from pulling away from the pipe. In the present invention, the expansion fit of the prior art for lining a pipe is improved by the liner having a metal powder. The resulting liner well-adhered to the pipe resists the separation and buckling characteristic of liners which do not include such powders.

In the embodiment where the preformed liner is applied to the exterior surface of a pipe, the preformed liner is tubular with the outer diameter of the tuber being slightly greater than the exterior diameter of the pipe to be lined. For such an embodiment, the tubular liner may be fitted over the pipe as a sleeve, followed by heating and cooling as described above.

In prior art systems where adhesion of a liner is poor, gas is able to permeate through the liner to corrode the pipe in the cases where the gas is corrosive, such as with sulfur dioxide, and to exert pressure on the inner surface of the liner. This results in blistering and eventual buckling of the liner to constrict and possibly block the interior of the pipe. Pipes of the present invention are able to resist the accumulation of fluids (gases and/or liquids) that might permeate through the liner and prevent thereby the accumulation of material at the interface of the pipe and the liner. This greatly retarding catastrophic failure. Moreover, the preformed liner of the present invention is sufficiently thick and defect-free so as to minimize the passage of corrosive material to the surface of the pipe.

Therefore, for all of the foregoing reasons, pipes of the present invention are able to withstand the harsh conditions of oil production. These pipes are able to withstand typical reservoir conditions that are at least about 250° F. (121° C.) and 7,500 psi (52 MPa), with 275° F. (135° C.) and 10,000 psi (69 MPa) being quite common. The pipes of the present invention are also able to withstand conditions as high as 350° F. (177° C.) and 20,000 psi (138 MPa) present in some high temperature/high pressure reserves. Higher melting perfluoropolymer, PFA, is preferred as the perfluoropolymer for the preformed liner in high temperature service such as this.

The invention is also applicable to pipe used in the Chemical Processing Industry (CPI), especially in those applications which require high purity and those applications where temperatures such as those described above are encountered. In the CPI temperatures of at least about 350° F. (177° C.) and even as high as 400° F. (204° C.) are used. The pipes of the preferred embodiment of this invention show superior permeation resistance to corrosive chemicals due to both to their construction, i.e., thick preformed liner, and their strong adherence to the interior surface of the pipe. The lined pipes of the present invention are able to withstand the above described conditions for continuous service, e.g., for at least about 30 days, preferably at least about 60 days, and more preferably at least about 12 months.

The preformed liner is impermeable to the corrosive materials present in the oil and presents a nonstick surface to the oil, whereby the organic materials present in the oil that become insoluble as the oil cools, do not stick to the liner and restriction of oil flow and plugging is avoided. Therefore the preformed liner of the present invention is able to provide insulation to the oil pipe to mitigate the change from hot underground conditions to cooler earth surface effects, thereby resisting the deposit of the insoluble organic and inorganic materials. In addition, the preformed liner of the present invention possesses increased abrasion resistance to sand and rock contained in the oil and to effects of tools scraping on the interior surface of pipe as these instruments are being lowered into the well for various measuring or servicing operations. The preformed liners of this invention resist both penetration and wear.

Because of all the above-noted advantages, the present invention is capable of reducing the deposition of at least one of asphaltenes, paraffin wax and inorganic scale by at least about 40%, preferably at least about 50%, as compared to the interior surface of said oil pipe without said lining being present. These reductions are also made in comparison to pipe lined with only an epoxy resin on the interior surface of the pipe. In fact, reductions of at least about 60%, about 70%, about 80% and even at least about 90% have been realized. Preferably these reductions apply to at least two of the deposition materials, and more preferably, to all three of them. Thus, with the preformed liner of the present invention, deposition in an oil well pipe of at least one of asphaltenes, paraffin wax, and inorganic scale may be reduced by at least about 40% as compared to the interior surface of said oil pipe without the liner being present. In addition, the preformed liner provides corrosion protection to the interior surface of the pipe.

TEST METHOD

Adhesion Testing

Adhesion testing is performed using a ASTM D 3167 "Standard Test Method for 90 Degree Peel Test of Adhesives. The test apparatus is the same as described in the ASTM.

This apparatus allows for a 90° angle to be maintained between the preformed liner and the substrate (the carbon steel pipe) during the entire test. The test specimens are ½" (1.3 cm) wide strips cut vertically from the sample pipes.

Specimens of preformed lined carbon steel pipes of approximately 4" (10 cm) inner diameter (ID) are sliced to do the adhesion tests. The test specimens are each about 12 in long. Peel strength (lbf/in) is measured over at least 3 inches, (disregarding at least the first 1 inch of the peel as suggested in ASTM D 6862-04) and is reported as an average value. Good adhesion is considered to be a minimum of 10 lbf/in. (10 lbf/in, 1750 N/m).

EXAMPLES

Fluoropolymer Resins

FP 1 is PFA: TFE/PPVE copolymer resin containing 3-4.5 wt % PPVE having a melt flow rate of 5-7.5 g/10 min and an average particle size of about 350-400 micrometers.

FP 2 is PFA: TFE/PEVE copolymer resin containing 5-8 wt % PEVE having a melt flow rate of 14-23 g/10 min and an average particle size of about 800 micrometers. FP3 is PFA: TFE/PPVE copolymer resin containing 3-4.5 wt % PPVE having a melt flow rate of 14-22 g/10 min and an average particle size of ⅛"/125 mils (3.2 mm) (pellets).

FP 4 is PFA: TFE/PPVE copolymer resin containing 3-4.5 wt % PPVE having a melt flow rate of 5-7.5 g/10 min and an average particle size of ⅛"/125 mils (3.2 mm) (pellets).

FP 5 is PFA: TFE/PPVE copolymer resin containing 3-4.5 wt % PPVE having a melt flow rate of 1.5-3.2 g/10 min and an average particle size of ⅛"/125 mils (3.2 mm) (pellets).

FP 6 is PFA: TFE/PPVE copolymer resin containing 3-4.5 wt % PPVE having a melt flow rate of 5.0-7.5 and an average particle size of 400 microns (0.4 mm) (beads).

Example 1

A preformed-PFA liner is made using FP-1 resin by dry blending PFA powder with 1 wt % zinc powder and forming the lining by means of rotomolding the resin into a tubular liner in a carbon-steel pipe to which a release agent, such as FreeKote 700 NC manufactured by Henkel Loctite Corp has been applied. For this example, a pipe having an ID of 4" is filled with the PFA/Zn powder blend. Endcaps are used to contain the powder in the pipe. The pipe is placed in a conventional rotomolding machine where it is heated at 700° F. (371° C.) for 30 minutes while rotating about 2 axes to make the preformed liner. The preformed liner is then released from the pipe. The outer diameter of the preformed liner is approximately the same as the inner diameter of the pipe. Although one could make a preformed liner by rotomolding, it is expected that it would be more economical to extrude preformed liners and the method used is in this example is only for purposes of illustration.

The interior of the pipe is then cleaned and sandblasted. The preformed liner is inserted into the pipe and the pipe is returned to the rotomolding machine. The pipe is heated at various temperatures for various amounts of time as shown in Table 1 while being rotated about one axis. Endcaps are used to contain the tubular liner in the pipe. Such a process leads to adhering a preformed liner to the pipe. Specimens of pipe are subjected to adhesion testing and results are shown in Table 1 below. All of the specimens showed good adhesion above 10 lbf/in (1750 N/m), above 20 lbf/in (3500 N/m), and even above 25 lbf/in (4400 N/m).

TABLE 1

| Example | Temperature | Hours | Load, lb/in. |
|---------|-------------|-------|--------------|
| Ex 1-1  | 720 F.      | 1     | 37           |
| Ex 1-2  | 720 F.      | 1     | 27           |
| Ex 1-3  | 740 F.      | 1     | 53           |
| Ex 1-4  | 740 F.      | 1     | 40           |
| Ex 1-5  | 700 F.      | 2     | 80           |
| Ex 1-6  | 700 F.      | 2     | 84           |
| Ex 1-7  | 720 F.      | 2     | 133          |

TABLE 1-continued

| Example | Temperature | Hours | Load, lb/in. |
|---------|-------------|-------|--------------|
| Ex 1-8  | 720 F.      | 2     | 135          |
| Ex 1-9  | 740 F.      | 2     | 88           |
| Ex 1-10 | 740 F.      | 2     | 120          |
| Ex 1-11 | 700 F.      | 3     | 95           |
| Ex 1-12 | 700 F.      | 3     | 74           |
| Ex 1-13 | 720 F.      | 3     | 104          |
| Ex 1-14 | 720 F.      | 3     | 80           |
| Ex 1-15 | 740 F.      | 3     | 107          |
| Ex 1-16 | 740 F.      | 3     | 150          |

Example 2

In this Example, carbon steel pipe is lined using a similar procedure as described in Example 1 with the exception that FP-2 powder is used to form the blended powder containing 1 wt % zinc. Pipes having an ID of 1" are used to form liners with a thickness between 90 mils (2.3 mm) by rotomolding at 700° F. (371° C.) for 60 minutes. Pipes having an ID of 4" (10 cm) are used to form liners with a thickness of about 90 mils (2.3 mm) by rotomolding at 700° F. (371° C.) for 45 minutes.

After the liners are formed and released from the pipes, the pipes are sandblasted as described in Example 1. The preformed liners are inserted into the pipes and the pipes are returned to the rotomolding machine. For the 1" (2.5 cm) ID pipes, temperatures ranging between 690° F. (366° C.) and 740° F. (393° C.). are used to heat the pipe with rotation about one axis for 60 minutes. For the 4" ID pipes, temperatures ranging between 700° F. (371° C.) and 760° F. (404° C.) for times ranging from 40 to 180 minutes are used to heat the pipe with rotation about one axis. All pipes are visually inspected by slicing the pipe in half. The linings cannot be pried away from the surface of the pipe indicating good adhesion of the liner to the pipe.

Example 3

Preformed liners are made by sequentially blending FP-1, FP-2, FP-3, FP-4 and FP-5 with 1 wt % Zn powder and feeding the blends separately to an extruder. The extruder is a commercial extruder manufactured by Davis Standard Division of Compton & Knowles Corporation (Pawcatuck, Conn.), Model # DS 15 HM producing tubular liners having an OD in the range of ⅛" (3.2 mm) to 1" (25.4mm) diameter. Small carbon steel pipes having an ID ranging from ⅛" to 1" diameter are lined after having been cleaned and sandblasted according to the same procedure described in Example 1, matching preformed liners with similar sized pipes by inserting the liners in the pipes and heating the pipes. The pipes are heated at 740° F. (393° C.) with rotation for times varying from 1-3 hours. All pipes are visually inspected by slicing the pipe in half. The linings cannot be pried away from the surface of the pipe indicating good adhesion of the liner to the pipe.

Example 4

Similar to the extrusion method described in Example 4, a preformed liner is extruded from FP 6 blended with 1 wt % zinc and 0.5 wt % mica to form a tubular liner of ½" (12.7 mm) diameter. A small carbon steel pipe with ID of ½" (12.7.mm) diameter is sandblasted prior to inserting the tubular preformed liner. The pipe is heated at 740° F. (393° C.) with rotation for 90 minutes. The pipe is visually inspected by slicing the pipe in half. The lining cannot be pried away from the surface of the pipe indicating good adhesion of the liner to the pipe.

The foregoing Examples demonstrate the adherence of the liner of melt processible copolymers of TFE of the present invention, as shown by the peel strength data. Such liners have good or better adherence than pipes lined with ETFE copolymer containing no zinc as well as PFA copolymer containing zinc which are formed by conventional rotolining techniques. Results emphasize the important commercial improvement in obtaining good adhering liners by using a more economic process to produce a pipe with a well adhered preformed lining.

What is claimed is:

1. A process for forming a lined pipe comprising:
    forming a preformed liner, wherein the preformed liner comprises a copolymer of tetrafluoroethylene and perfluoro(alkyl vinyl ether) and an effective amount of a metal powder to adhere the liner to the surface of the pipe, wherein said metal powder is selected from the group consisting of zinc, copper, and tin or combinations thereof;
    applying said preformed liner on the surface of the pipe, wherein the surface of the pipe is free from primer layer and adhesive; and adhering said preformed liner to the surface of the pipe.

2. The process of claim 1, further comprising: roughening the surface of the pipe prior to applying said preformed liner on the surface of the pipe.

3. The process of claim 1, wherein forming said preformed liner comprises extruding a copolymer of tetrafluoroethylene and perfluoro(alkyl vinyl ether) to form the preformed liner.

4. The process of claim 1, wherein forming said preformed liner comprises co-extruding an inner layer and an outer layer together to form the preformed liner.

5. The process of claim 4, further comprising co-extruding at least one intermediate layer between the inner layer and the outer layer to form the preformed liner.

6. The process of claim 1, wherein said preformed liner further comprises a plurality of barrier particles.

7. The process of claim 4, wherein the outer layer is free of metal powder.

8. The process of claim 4, wherein the outer layer consists essentially of tetrafluoroethylene/perfluoro(alkyl vinyl ether) copolymer.

9. The process of claim 1, further comprising heating the pipe and/or the preformed liner applied on the surface of the pipe to adhere the preformed liner to the surface of the pipe.

10. The process of claim 9, further comprising rotating the pipe about an axis while heating the pipe to adhere the preformed liner to the surface of the pipe.

11. The process of claim 1, wherein the metal powder comprises zinc.

12. The process of claim 1, wherein the steps of applying and adhering said preformed liner on the surface of the pipe comprises inserting said preformed liner into the pipe and adhering said preformed liner to an interior surface of the pipe.

13. The process of claim 1, wherein the preformed liner has an initial outer diameter that is larger than an inner diameter of the pipe prior to the preformed liner being applied on and adhered to an interior surface of the pipe.

* * * * *